United States Patent [19]

Nelson et al.

[11] 4,014,486

[45] Mar. 29, 1977

[54] DOOR ACTIVATED AIRBORNE STAIR STRUCTURE

[75] Inventors: Neal A. Nelson, Bellevue; Clarence E. Jacobus, Des Moines, both of Wash.

[73] Assignee: The Boeing Company, Seattle, Wash.

[22] Filed: Nov. 7, 1975

[21] Appl. No.: 629,865

[52] U.S. Cl. .............................. 244/129.6; 14/71.3; 105/447; 182/78; 244/137 P; 49/37; 49/387
[51] Int. Cl.² .......................................... B64C 1/24
[58] Field of Search ....... 244/129 R, 129 S, 129 D, 244/137 R, 118 R, 137 P, 118 P; 182/77, 78, 81, 97, 98; 14/71 R, 71 A; 214/75 R, 75 T, 85; 105/437, 443, 447, 448; 49/37, 387, 103

[56] References Cited

UNITED STATES PATENTS

| | | | |
|---|---|---|---|
| 2,531,263 | 11/1950 | Fink et al. | 244/129 S |
| 2,541,288 | 2/1951 | Rice | 214/85 |
| 2,547,811 | 4/1951 | Burnelli | 244/118 |
| 2,933,149 | 4/1960 | Lee | 244/129 S |
| 2,990,148 | 6/1961 | James | 244/129 S |
| 3,047,093 | 7/1962 | Cruz | 182/97 |

FOREIGN PATENTS OR APPLICATIONS

| | | | |
|---|---|---|---|
| 235,665 | 6/1925 | United Kingdom | 49/37 |

*Primary Examiner*—Trygve M. Blix
*Assistant Examiner*—Galen L. Barefoot
*Attorney, Agent, or Firm*—Christensen, O'Connor, Garrison & Havelka

[57] ABSTRACT

An air stair-door combination for an aircraft is described in which interference between the door and the stairway in opening and closing thereof is eliminated by delayed motion of the stairway until the door is moved through a significant portion of its travel. The stair being interconnected to the door counterbalances a portion of the weight of the door, thus decreasing power requirements for opening and closing the stairway and door. A folding handrail structure adapted to nestle into the folded stairway is described. The door and stair actuator operates on a pivot point located on the door such that initial opening movement of the door causes stair operating rods to first travel downwardly past an overcenter point, then upwardly through further movement of the pivot point. The stair segments are projected outwardly by stair actuator linkage means driven by the operating rods. The initial lost motion of the operating rods and stair actuator linkage permits the door to open sufficiently for the stair to clear the door during deployment.

7 Claims, 17 Drawing Figures

DOOR ACTIVATED AIRBORNE STAIR STRUCTURE

BACKGROUND OF THE INVENTION

This invention relates to access stairways for aircraft foldable and stowable on board the craft and further relates to such stairways interconnected with an access doorway for coordinated opening of the door and stair.

The advent of large commercial and military aircraft such as the so called "wide body" jet transports necessitates access to the lower lobe portion of the craft by personnel for such functions as stowing cargo and baggage, equipment servicing and similar activities. In addition, usage of large aircraft for the transport of large numbers of passengers may require usage of the lower portion of the craft for passenger seats as well as the presently contemplated centrally located passenger deck. It is well known to use stowable folding on board air stairs for access to passenger compartments in smaller aircraft, such as is shown in U.S. Pat. No. 2,531,263 issued to F. W. Fink et al., Nov. 21, 1950. While this device employs a counterbalance between the door and the stair to minimize effort exerted by the operator in opening and closing the apparatus, the door must first be completely or nearly completely be opened before the stair can be extended and retracted and therefore direct mechanical coaction between the stair and the door is not feasible. The counterbalancing effect is obtained through usage of a spring means to store the energy obtained through movement of the door initially which is then transmitted to the movable stairway.

Having the door positioned on the lower lobe area of an aircraft further compounds the problem of coaction of the door and stair. Due at least in part to the geometrical configuration of a lower lobe door and stair combination, a direct interlinkage of the door and stair operating mechanisms has heretofore not been practiced.

OBJECTS AND SUMMARY OF THE DISCLOSURE

It is therefore an object of this invention to provide an on board stairway mechanism interconnected to a door by a direct mechanical linkage in which outward movement of the stair portion is delayed until the door is opened adequately to permit the stair to clear the door during its outward and downward rotation in deployment. A related object of this invention is to provide a mechanical linkage for operating a door and stair for an aircraft in which the weight of the stairway counterbalances at least part of the weight of the door to minimize forces necessary for opening the door and stair.

It is a further object of this invention to provide a folding on board stairway—door combination in which the length of the stairway is maximized for the available stowage space in the aircraft.

One specific object of this invention is to provide a folding handrail means for an on board aircraft stairway which occupies a minimum space in the aircraft when stowed, yet opens out to a sturdy rail for safe entry into the aircraft by personnel whenever the stair carrying the handrail is deployed.

A further specific object is to provide an air stair for an aircraft which has a retractable wheel means at the ground engaging end thereof which is foldable and stowable into the stair structure, thus maximizing the length of the stairway. A related specific object is to provide ground engaging wheel means on the stairway to accommodate aircraft movement relative to the ground as encountered for example in loading and unloading the aircraft.

THE INVENTION

As herein disclosed this invention is advantageously achieved by equipments installed in an aircraft including a door means positioned in the fuselage of an aircraft being hinged along its upper peripheral edge and further being opened and closed by an operator motor positioned adjacent the hinge. The door means is operatively connected to a unique folding stairway operator mechanism located adjacent to the door sill by a direct mechanical linkage. The door operator means drives the door from a closed to an open position through a pivot means attached to the door a short distance from the hinge. When the door is closed the pivot means is located inboard of a line between the hinge and the door sill. As the door is opened the pivot point travels through an arc which intersects that line, thence further travels that arc to a position outboard of the above noted line when the door is fully opened. The mechanical linkage between the door and the stair operator is also connected at or adjacent to the door drive pivot. As the door opens, the linkage initially travels downwardly to the point at which the arc traveled by the pivot intersects the line between the hinge and the stairway operator mechanism and thereafter travels upwardly with the pivot to the door open position. During the above-described downward travel of the drive rod, the stair actuating mechanism causes the stairway to pivot inboard of the door aperture a short distance then, upon reversal of direction of movement of the drive rod, causes the stairway to rotate about a horizontal axis adjacent the door sill outwardly toward a ground engaging position when fully extended. The "lost motion" encountered in the above described movement of the mechanical linkage and associated stair actuator mechanism provides sufficient lag time for the door to reach a partially open position adequate for the stair to clear as it folds outwardly and downwardly to its ground engaging position. The weight of the stair counterbalances a portion of the weight of the door, thus requiring less effort to open and close the entire mechanism. A pantograph-type linkage is utilized to open the lower segment of the stair into its operative extended position and to cause it to assume a position nestled against the upper portion of the stair when stowed. This pantograph linkage mechanism provides increased resistance to wind forces and a positive means of opening and closing the lower segment of the stair in operation. A simple mechanical linkage arrangement results requiring no indirect energy storage means to obtain the counterbalancing effect between the door and the stair.

Hand rails for usage in ascending and descending the stair are pivotally mounted on stanchions on the upper and lower airstair segment and to a pivot location connected to the framework of the aircraft. The hand rail folds into a nestled position occupying a minimum of space when the stair segments are stowed within the aircraft. Upon outward and downward rotation of the stair segments, the hand rail rises above the surface of the stair segment and is erected into its operative position when the stair segments are fully extended.

For service in large aircraft the door operated airstair mechanism of this invention preferably is constructed using two stair segments which are interconnected as noted above by a pivotal automatic extending linkage means of a pantograph nature. For special applications a single stair segment may be found to be adequate or further length may be found to be necessary for aircraft positioned at an unusually high position above the ground during loading and unloading maneuvers.

These and other features, objects and advantages of the invention will become more fully evident from the following description of a preferred embodiment by reference to the appended drawings.

DETAILED DESCRIPTION OF THE PREFERRED EMBODIMENTS

Figure 1:
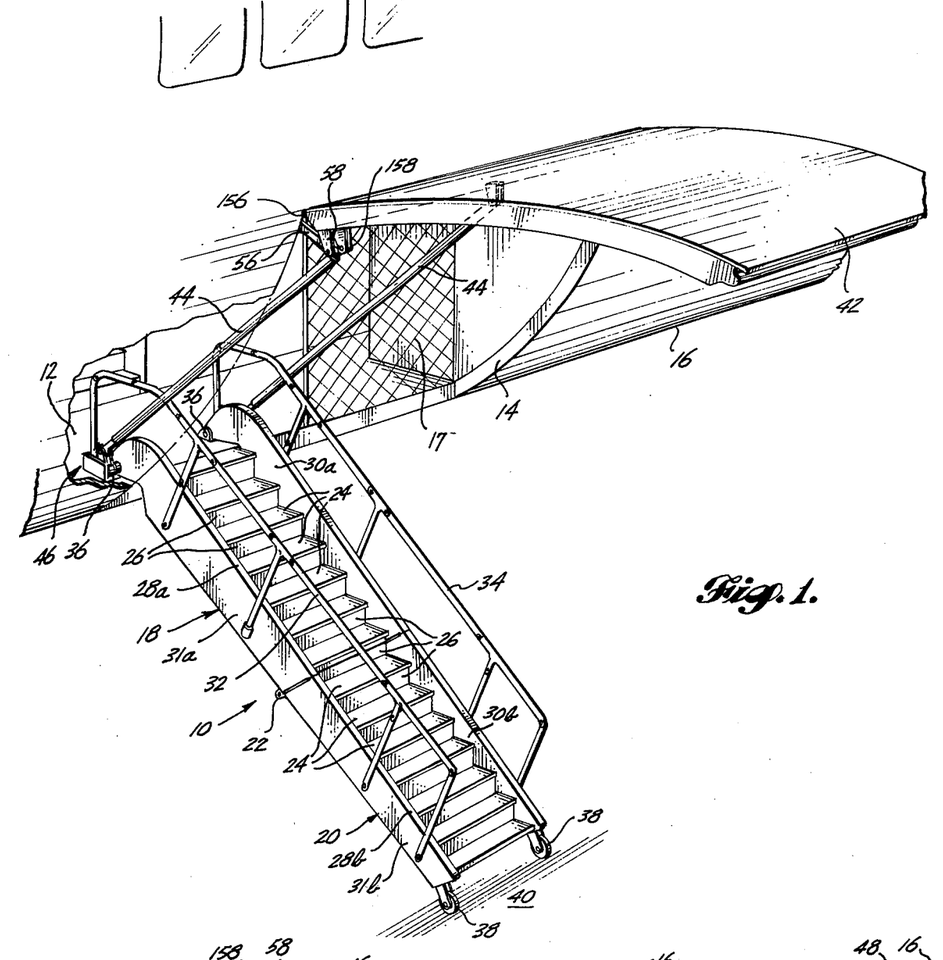
FIG. 1 is a perspective view of a door aperture in the lower lobe of an aircraft fuselage incorporating the door activated airborne stair structure of the present invention.
Figures 9, 10:
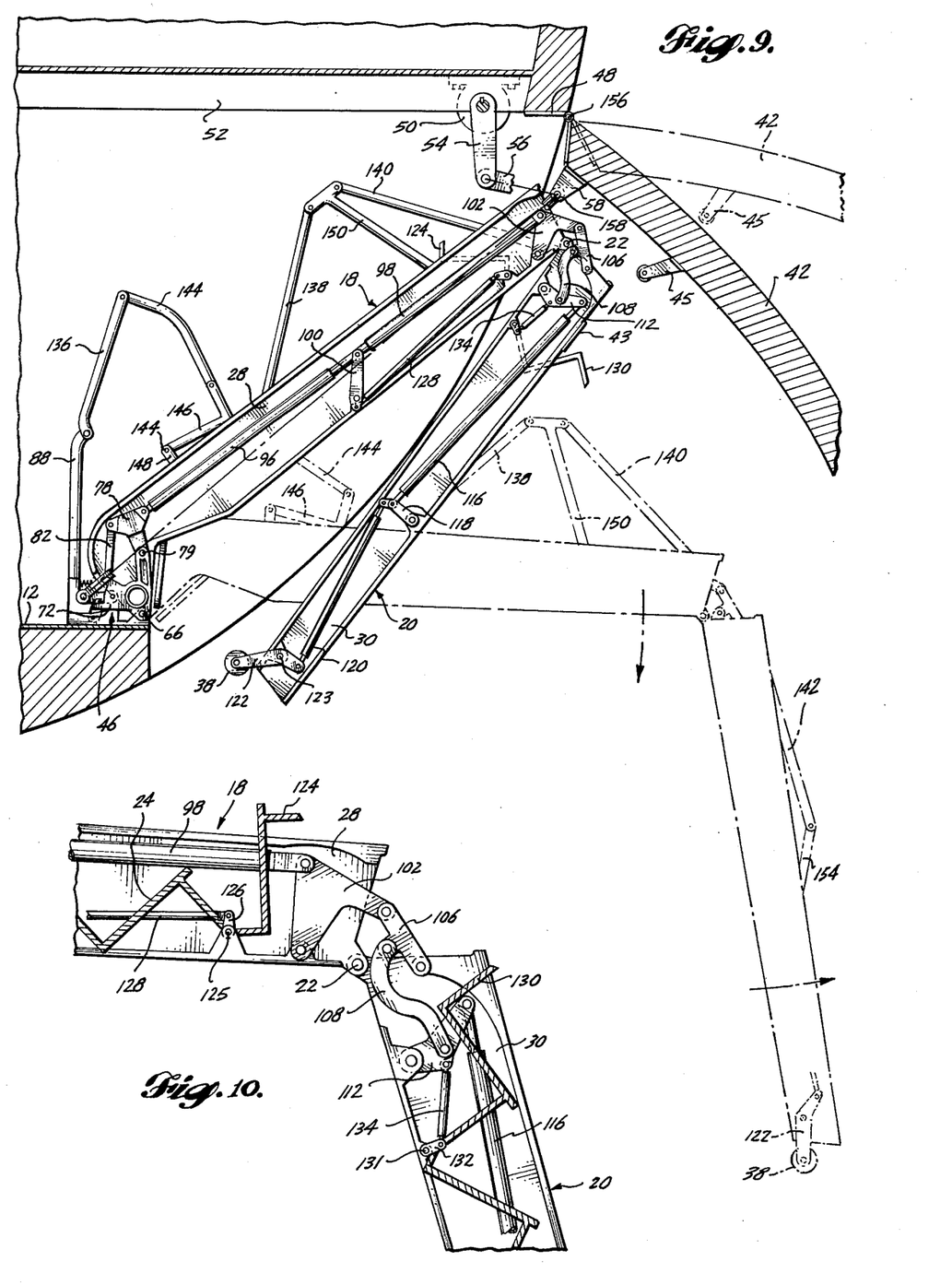
FIG. 9 is a view similar to FIG. 7 showing the airstair partially extended.
FIG. 10 is a view similar to FIG. 8 with the airstair in the partially extended position of FIG. 9.

Referring specifically to the drawings there is shown a door-operated airstair assembly 10. As illustrated in FIG. 1, the airstair is mounted on the deck 12 adjacent the sill 11 of the cargo door opening 14 in the side of the lower lobe of an aircraft fuselage 16. The airstair in this embodiment provides personnel access to and from the lower lobe area in a wide body type aircraft. A safety net 17 may be affixed within the door opening adjacent to the airstair assembly when the door is opened and the airstair is extended and cargo transfer is not in progress to insure safety of individuals using the airstair. The airstair assembly is comprised of upper section 18 and lower section 20 joined end to end by a hinge 22 which permits the sections to fold upon one another for stowing on board the aircraft. Each stair section is comprised of a step 24 and riser panel 26 fixed between upper side channels 28a and 30a and lower side channels 28b and 30b. These side channels, as well as providing the structural framework for the airstair, house operating linkages and provide support for self-folding handrails assemblies 32 and 34 which are described in detail below. The interiors of the side channels are accessible by removable panels 31a and 31b on the outboard sides of the respective stair sections for inspection and maintenance of the stair extending and retracting mechanism. The upper ends of the side channels 28a and 30a pivotally engage frame 36 on the cargo deck in such a manner as to permit the airstair to pivot as a unit upwardly into the aircraft for stowage. The airstair lower section 20 has retractable support wheels 38 extending from the lower end thereof which rotate from a stowed position to a ground-engaging position when the assembly is extended. An operating linkage for the wheels 38 is shown in FIGS. 2 and 9 and is discussed at length below.

A faired, motor-driven cargo door 42 is connected by hinge 156 to a fuselage structure along its upper edge and is linked to the airstair via operating rods 44. The rods 44 acting through a pair of main operating linkage mechanisms 46 (only one being visible in the drawings) cause extension and retraction of the stair upon rotation of the door 42 about hinge 156. The interconnection between the door and the stair is such that opening and closing of the door effects extension and retraction of the stairs through the direct mechanism linkage shown. The airstair is designed and coupled to the door in such a manner that the airstair assembly acts as a counterbalance to the door upon extension, thereby permitting a relatively simplified door operating and drive means.

Figure 4:
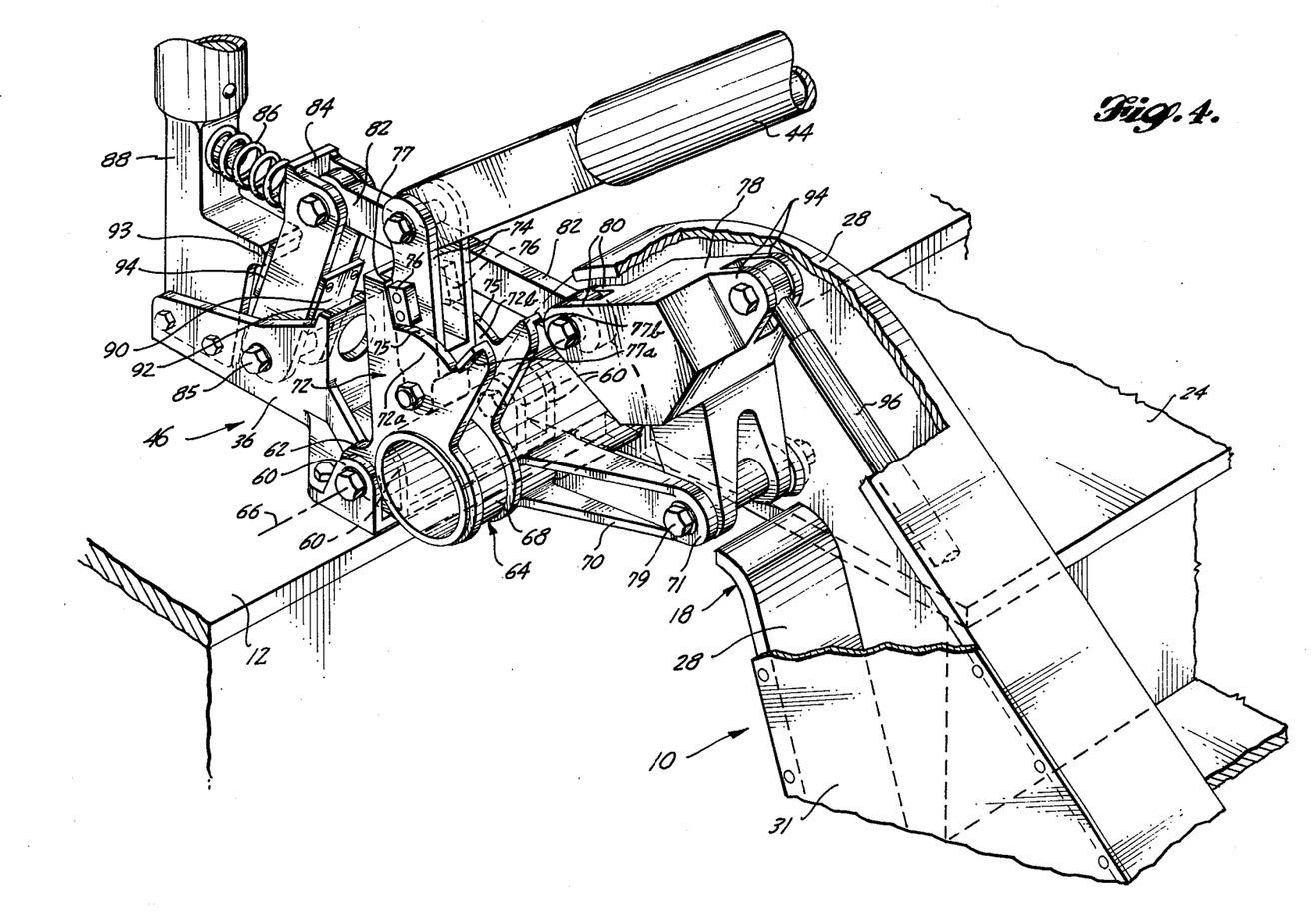
FIG. 4 is an isometric view of one of the airstair main operating linkage mechanism with portions thereof cut away to reveal interior features.
Figures 5A, 5B, 5C:
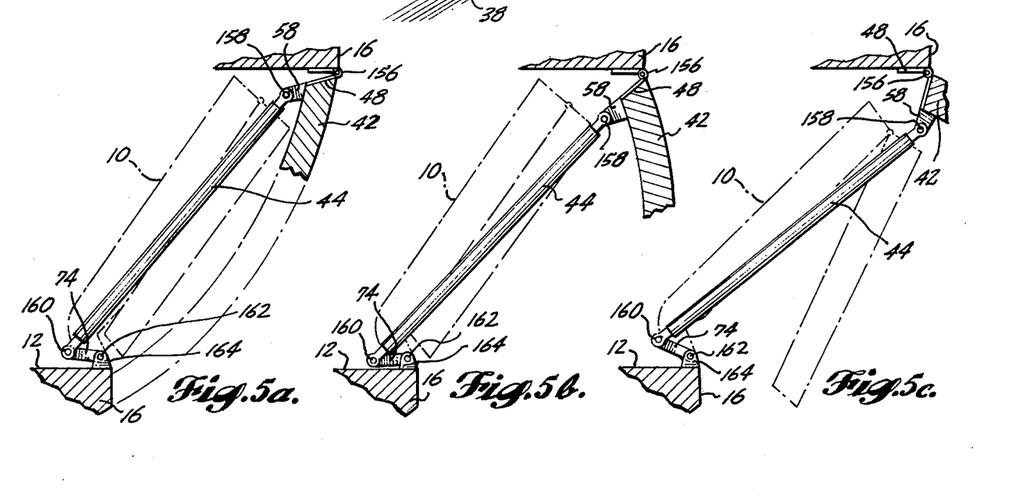
FIGS. 5a through 5c schematically illustrate the sequential interaction of the operator rods linking the airstair and the cargo door as the cargo door is opened.

FIGS. 5a–5c provide a schematic portrayal of the mechanical movements of the cargo door 42 and the airstair operating rods 44 which in turn operate upon airstair 10 through crank 74. The physical interrelationship of the hinge 156, pivots 158 and 160, the operating rods 44, and the door 42 describe an overcenter linkage arrangement. The linkage is so disposed as to utilize the mass of the airstair to offset or counterbalance the moment of the door bearing through the operating rods whenever the airstair is extended. Referring to FIG. 5a, the door 42 is shown closed and latched, and the airstair assembly 10 is folded into its stowed position shown schematically in outline. The operating rod 44 is attached on its upper end to pivot 158 on door flange 58. On the lower end, the rod is attached to pivot 160 on idler crank 74 which is in turn attached to pivot 162 on flange 164 mounted on the deck 12. The crank 74, pivot 162 and flange 164 in FIGS. 5a–5c represent a schematic simplification of the airstair main operating linkage assembly 46 (FIG. 4) which rotates the airstair about its pivot. Note in FIG. 5a that pivot 158 is displaced inboard from a line passing through pivots 156 and 160 such that the linkage resides in an overcenter relationship. FIG. 5b shows the door 42 partially open with the pivot 158 on the door flange 58 passing out of the overcenter relationship with the door hinge pivot 156 and lower rod pivot 160. Note that though the door is partially open, the airstair assembly 10 has not begun to move outwardly, a circumstance accounted for by the fact that the downward longitudinal movement of the operating rod 44 causes a minor amount of rotation of the airstair assembly inwardly about pivot axis 162. As the door 42 continues its rotation outwardly and upwardly about hinge 156, rod 44 begins to translate upwardly permitting the airstair operating assembly 46 to rotate the airstair outwardly. Continued opening of the door results in the airstair being rotated outwardly and downwardly as shown in FIG. 9. Lower airstair section 20 opens outwardly during outward rotation of the airstair assembly due to the pantograph-type linkage, described at length below, used to control the orientation and position of the airstair segments. Continued outward rotation of the airstair assembly 10 begins to extend it into a counterbalancing relationship with the door as coupled through the operating rod 44.

Figures 2, 3:
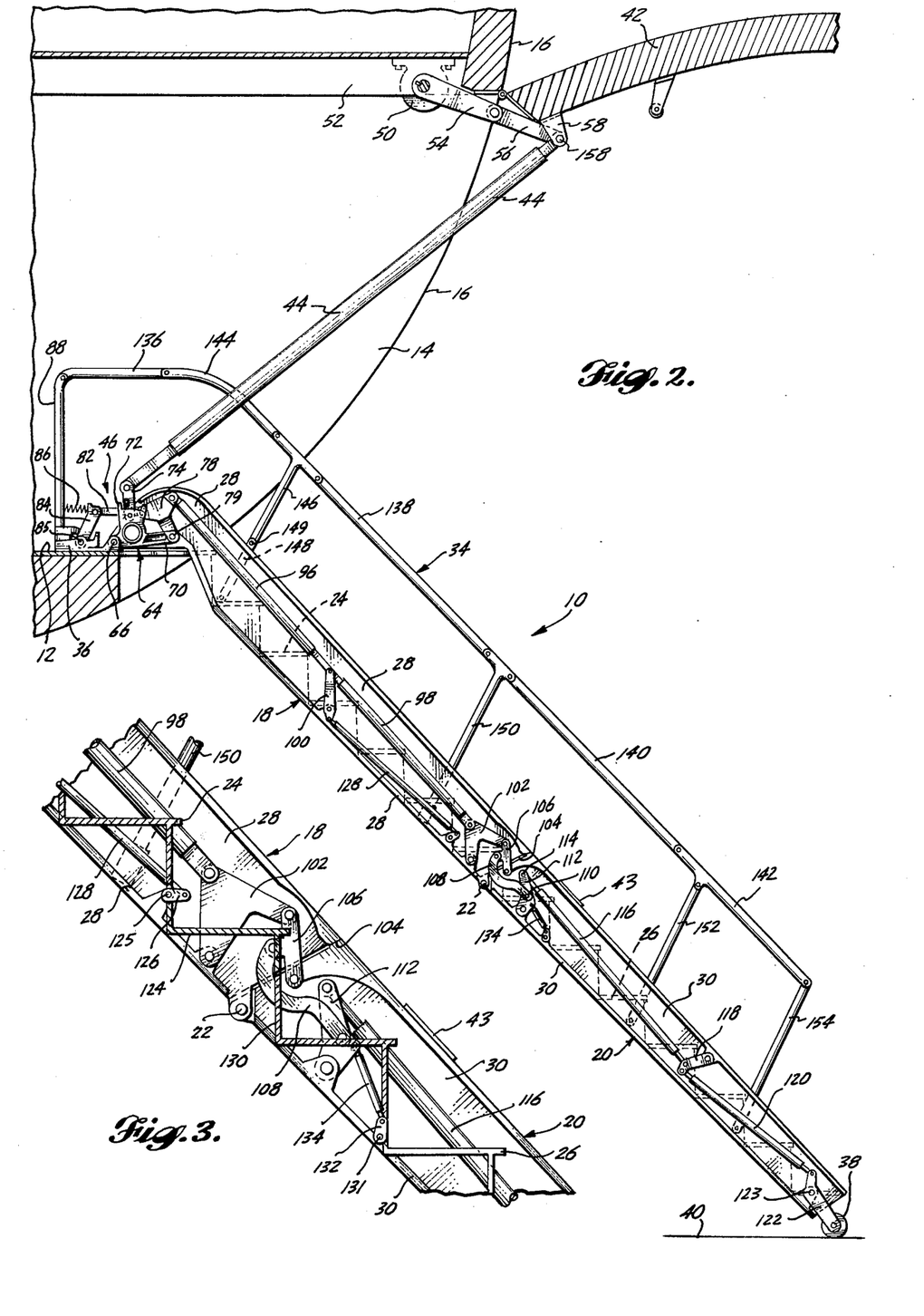
FIG. 2 is a partial transverse section through the aircraft fuselage providing a side elevation view of the airborne stair structure of FIG. 1 in fully extended position. Nearside airstair handrails and access panels have been removed to reveal internal operating linkages.
FIG. 3 is an enlarged view of the pivot shown in FIG. 2 between the upper and lower stair sections with the airstair fully extended. Side channel cover panels have been omitted to reveal operating linkages.

Details of the airstair assembly and the mechanism which associates it with the cargo door and related drive means may be observed by referring to FIGS. 2, 3 and 4, as well as certain features shown in other figures. Although substantially identical airstair operator mechanisms linked to common drive means are located on either side of the door and airstair and operate in unison, only the nearside mechanism is illustrated in the figures and is discussed in the following text. As previously noted, the cargo door 42 is attached to the aircraft structure by hinges 48 along its upper edge such that when the door is closed, its outer curve surface, in closing the cargo access opening, is faired with the outer fuselage skin. The door is hinged at its upper edge such that upon unlatching and opening, the door swings outwardly and then upwardly about its hinges 48. The door operating motor 50 is attached to the aircraft interior frame structure, upon the passenger deck supporting member 52 or on other suitable structural members. A lever arm 54 affixed to the drive motor shaft is connected to drive link 56 which in turn is pivotally connected to flange 58 on the door. Airstair operating rod 44 also is pivotally connected to the flange 58 and provides the drive forces for extension and retraction of the airstair through airstair main operating linkage mechanism 46.

The main airstair operating linkage mechanism 46, shown in detail in FIGS. 4 and 11a–11e, is attached to the cargo deck 12 by frame 36. Frame 36 provides housing and attachment for the mechanism which receives drive forces via the operating rods 44 and transmits the forces to the airstair for extension and retraction thereof. The frame 36 provides pairs of upright flanges 60 to which flanges 62 on the drive fitting 64, integral to the side channel 28 of the upper airstair section 18, are attached to form the airstair assembly pivotal axis 66. The drive fitting 64 includes a torque tube 68 which is fastened to the side channel 28 on one end. Strut 70 extends outwardly from torque tube 68 to a pivotal mounting location 71 for offset crank 78. Drive lever 72 comprised of interconnected, parallel plate members 72a and 72b provides a pivotal mounting location for idler crank 74 which is in turn pivotally connected to the lower end of operating rod 44. The idler crank 74 is restricted in its pivotal travel within yoke 75 by stop blocks 76 which abut flanges 77 and 77a on drive lever 72.

Figures 6, 7, 8:
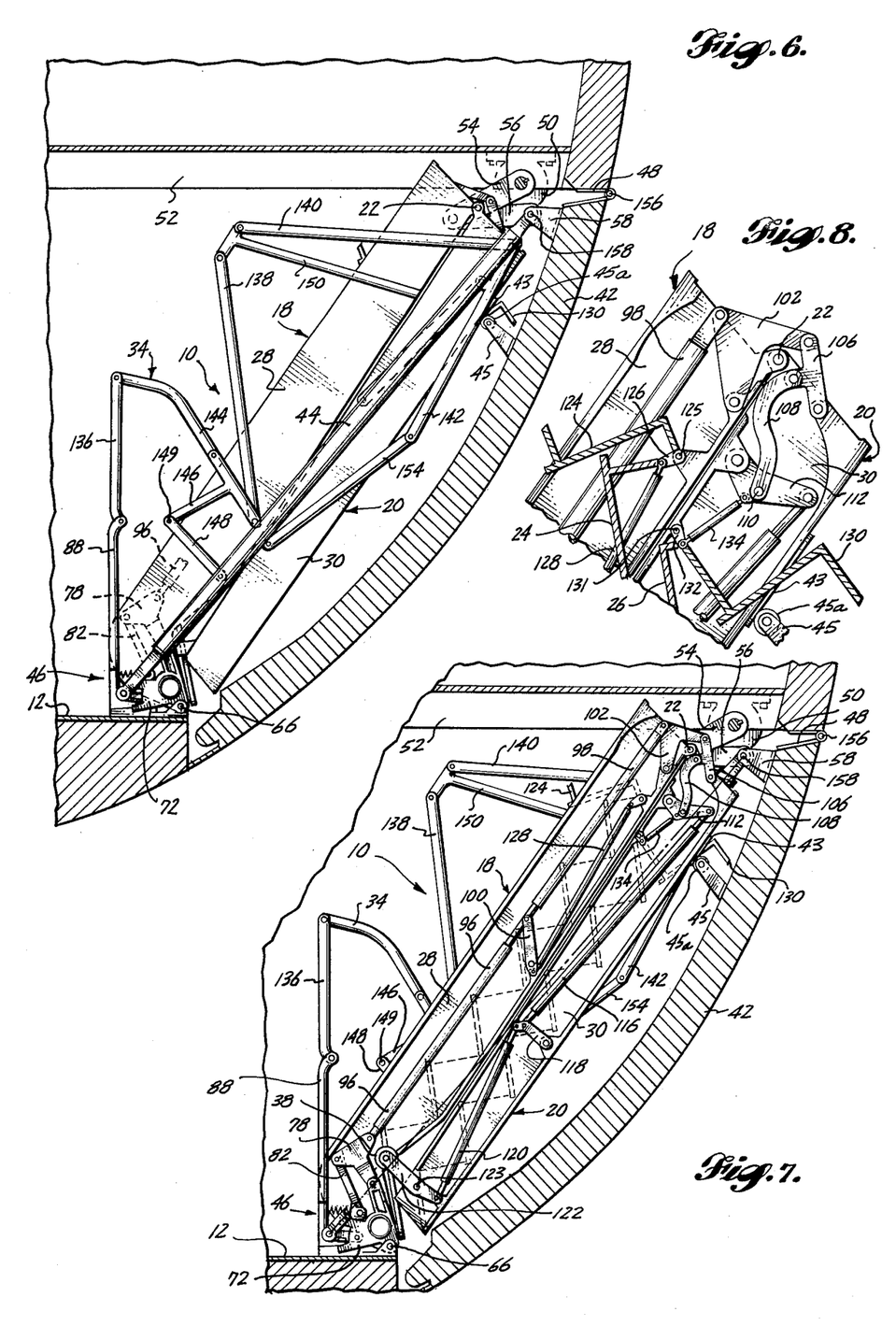
FIG. 6 is a partial transverse section of the fuselage, similar to FIG. 2, showing the airstair fully stowed and cargo door closed and latched.
FIG. 7 is a view similar to FIG. 6 except that nearside airstair handrails and access panels have been removed to reveal internal operating linkages.
FIG. 8 is a view similar to FIG. 3 with the airstair in the fully stowed position.
Figure 11A:
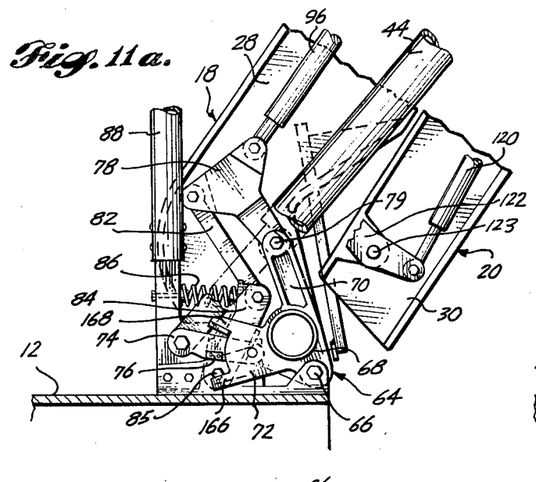
FIGS. 11a through 11e illustrate the airstair main operating linkage mechanism in side elevation in a sequence corresponding to airstair fully stowed in FIG. 11a through airstair fully extended in FIG. 11e.
Figure 11B:
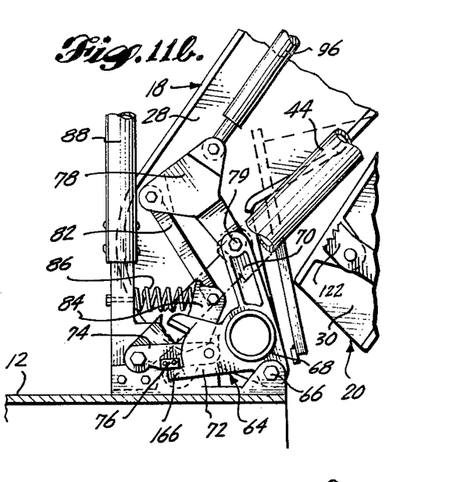
Figure 11C:
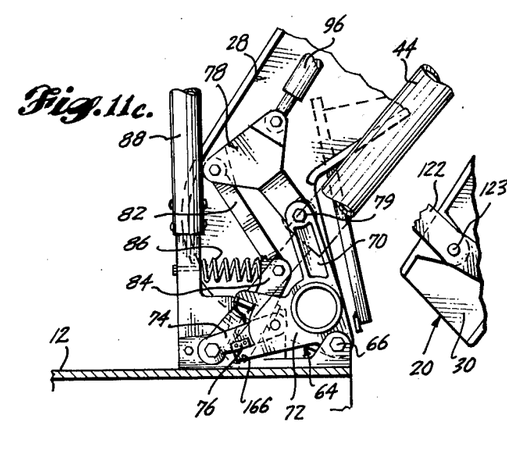

Yoke 75 with idler crank 74 therein permits operating rod 44 to be disengaged from the airstair operating mechanism when the cargo door is closed as shown in FIGS. 6, 7 and 8 with roller 45a forced against pad 43, thereby lifting the airstair assembly 10 and relieving the rotational forces imposed by the airstair on operating assembly 46. (See FIG. 11a) Similarly, when the airstair is fully extended and in contact with the ground, as is best seen in FIGS. 1, 2 and 11e, the rotational forces are again relieved from airstair operating assembly 46. Yoke 75 thus accommodates discontinuities in ground level and permits the airstair to be positioned at various angles with respect to the ground without torque imposed on the operating mechanism 46 whenever the airstair is fully extended.

The angular relationship between the upper airstair portion 18 and the lower airstair section 20 is controlled by a pantograph-type linkage best seen in FIGS. 2 through 4, and 7 through 9 with elements of the pantograph-type linkage system being shown in various of the other views. The pantograph linkage is anchored at one end by the spring biased stop crank 84 which is mounted for limited pivotal movement about the bolt 85. Spring 86 urges the stop crank 84 outboard until bearing pad 90 abuts upon flange 92. This position is assumed whenever the airstair is in its stowed or nearly stowed position. Upon extension of the airstair into its open position forces imposed as discussed below upon offset crank 78 and then through pantograph link 82 cause the stop crank 84 to rotate against the forces imposed by spring 86 until bearing pad 94 abuts upon flange 93 as shown in FIG. 11e. As the ground engaging wheel contacts the ground, the stairway sections move together at stop 24 to form a continuous, rigid stair which forces the stop crank 84 to take up a position midway between stops 92 and 93.

Figure 11D:
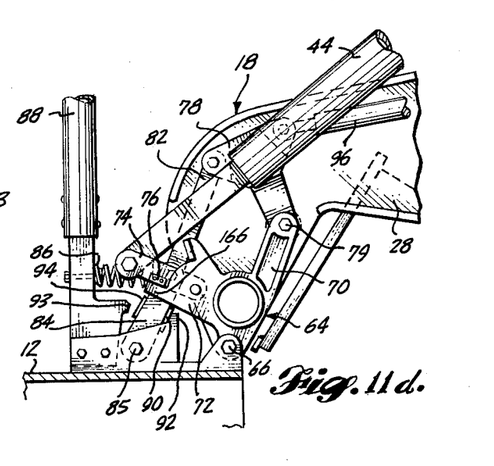
Figure 11E:
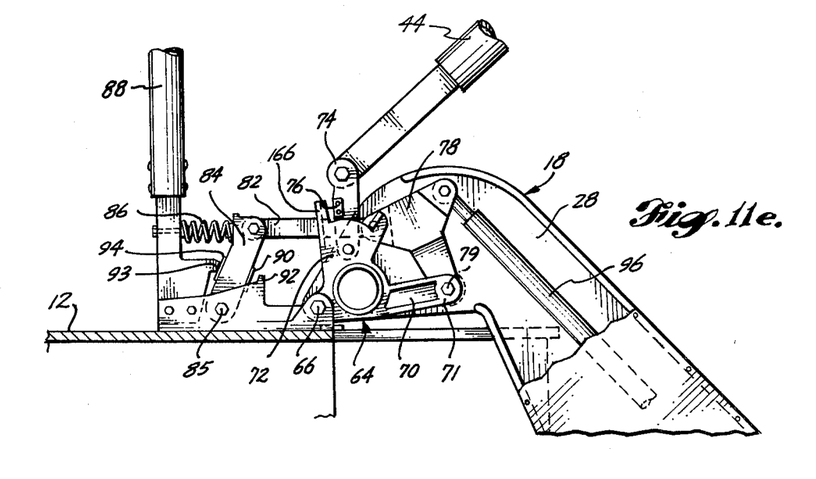

FIG. 11d shows the airstair in the position most vulnerable to external wind loads. The purposely devised alignment of link 82 and crank 94 at this position provides positive resistance to wind loads while still allowing for ground variations when fully extended.

Offset crank 78 is mounted for pivotal movement about pin 79 which extends between arm 70 and upper side channel 28. Since the entire airstair assembly pivots about pivot axis 66 and since pantograph link 82 is substantially stationary at its mounting point on stop crank 84, the offset crank 78 is caused to move from the position shown in FIG. 11a to the position shown in FIG. 11e during the extension of the airstair. It will be seen that as a consequence the upper drive link 96 is retracted from the position shown in FIG. 11a and in FIG. 7 to the position which is shown in FIGS. 2 and 3 upon extension of the airstair into its operative position.

Again, referring to FIGS. 2 and 3, the lower end of the upper drive link 96 drivingly engages a lower drive link 98 and an idler crank 100 for reciprocation. Crank 100 is mounted on the side channel 28 structure so as to support the drive links 96 and 98 through the span of their longitudinal travels. The other end of the lower drive link 98 operates a folding yoke 102 rotatively mounted upon upper stair section side channel 28. Folding link 106, pivotally attached on one end to the folding crank 102 and on the other end to the structure of the lower stair section side channel 30 causes lower stair section 20 to fold about hinge 22. Thus, movement of the drive link 98 inboard of the aircraft causes the lower stair section 20 to travel from its folded position as shown in FIGS. 6, 7 and 8 through the various positions shown in FIGS. 9, 10 to the fully open position shown in FIG. 2.

In the preferred embodiment shown, a ground engaging wheel 38 is utilized to support the outboard end of the lower stair section 20 when the stair is extended. In order to minimize the length of the stair in its stowed position the wheel assembly, including frame 122 and wheel 38 is rotatable into the stowed position shown in FIG. 7 from the fully extended position shown in FIG. 2. A drive rod assembly accomplishes this motion by attachment to folding link 106 through a curved link 108 which in turn is pivotally mounted upon a lever 112. The extremity of the lever 112 in turn drives link 116 which in turn is connected through arm 118 and hence lower wheel positioning link 120 to the wheel frame 122. Upon raising and retraction of the stair assembly, link 116 traverses downwardly toward wheel 38, thus causing the frame 122 to pivot about pivot point 123 in order to stow wheel frame 122 in the position shown in FIG. 7.

The chain of linkages just described performs several functions; it folds and unfolds the sections of the airstair assembly to effect retraction and extension and simultaneously retracts and extends the supporting wheels at the lower extremity of the assembly. In addition, two secondary linkages are connected to the main linkage within the airstair side channels to operate movable stair elements. Two pivoted riser segments, one on the upper stair section 18 and one on the lower stair section 20, rotate into engagement with each other and with the adjacent stair section when the airstair assembly is extended so as to effectively join the step and riser panels 24 and 26 of the stair sections at the joint 104 to form a continuous flight of stairs. The upper riser segment 124 as seen in FIG. 3 is pivoted on the upper stair section side channel 28 about pivot 125 and via a positioning crank 126 integral to the riser segment is connected to an upper riser segment positioning link 128. The positioning link is pivotally connected on its upper end to the previously described idler crank 100 (FIG. 2) which centrally supports the upper and lower drive links 96 and 98. In a similar manner, the lower riser segment 130 is pivoted on the lower stair section side channel 30 about pivot 131. A positioning crank 132 integral to the riser segment is connected to a lower riser segment positioning link 134 which is pivotally connected to the previously described drive crank 112 associated with the support wheel positioning linkage.

The preferred support wheel positioning linkage for locating wheel 38 at its operative position as shown in FIGS. 2 and 9 is connected with the pantagraph type linkage described above for folding and extending the airstair segments. As best seen in FIGS. 7 to 10, a curved link element 108 is pivotally mounted upon folding link 106 at approximately the mid-section thereof such that angular motion of the folding link 106 with respect to lower airstair segment 20 causes curved link 108 to reciprocate. A cross-link 112 is pivotally mounted on the lower surface of the lower airstair segment 20 and is connected at its approximate midpoint to curved link 108. At one end of cross-link 112, a drive linkage member 116 is attached which extends down a substantial length of the lower airstair segment 20, and operates a second pivotally mounted cross-link 118. A second drive linkage member 120 further extends from cross-link 118 to the vicinity of the end of lower airstair segment 20. The lower end of drive rod 120 pivotally interconnects with the wheel mount 122 causing rotation thereof about pivot 123 with respect to lower airstair 20 as rod 120 reciprocates within lower airstair segment 20. Thus, wheel 38 is caused to rotate from its nestled position shown in FIG. 7 to the extended position shown in FIGS. 1 and 2 by the above-described linkage as the airstair rotates outwardly and downwardly.

The system of self-folding handrails 34 mounted on the side channels of the airstair assembly cooperate with the movement of the airstair to assume a rested position occupying a minimum of space while stowed yet erect into a sturdy and convenient handrail when the airstair is deployed. Anchored to fixed stanchions bolted to the cargo deck fitting and supported by fixed, folding and pivoted stanchions on the upper and lower airstair sections, the segmented handrail folds and unfolds automatically and in synchronism with the airstair as it is retracted and extended. As can be seen in FIG. 2, the handrail system 34 is comprised of four straight segments 136, 138, 140 and 142, and a curved segment 144, all joined to adjacent segments by pivot joints. The fixed handrail stanchion 88, being secured to the deck fitting 36 has the end handrail segment 136 pivotally attached to its upper end. The fixed stanchion 88 anchors the entire handrail system to the aircraft structure and provides the primary leverage for erecting the handrail to its operative position. The upper stanchion 146 on the upper airstair section 18 is pivoted on the side channel 28 and is carried by stanchion stub 148 at a central joint 149. The lower stanchion 150 on the upper stair section 18 is fixed. Two handrail stanchions 152 and 154 on the lower airstair section 20 are pivoted on the side channel 30 and are likewise pivotally connected to the lower handrail section 142.

The operation of erecting the handrails, which is described in detail below is accomplished due to movement of stanchion 150 with respect to fixed stanchion 88 during deployment or stowage of the airstair. The pivotally linked handrail segments are caused to fold upon one another and stow into a convenient size onboard the aircraft.

OPERATION OF THE PREFERRED EMBODIMENT

The operation of the apparatus described above can best be seen by an examination of the drawings beginning with FIGS. 6, 7, 8 and 11a showing the device in the stowed and door closed position. In FIG. 6 the lower airstair section 20 is shown nestled against the upper airstair section 18 with handrail 34 folded about the airstair sections. In this position, torque on the stair actuator 46 is relieved by engagement of the support pad 43 by stop 45 on door 42. A roller 45a on stop 45 permits rolling rather than sliding contact with pad 43 as the door is opened and closed.

In preparation for opening door 42, a lock mechanism (not shown) is opened and door 42 is permitted to swing downwardly and outwardly about door hinge 48 as is best seen schematically in FIG. 5b and in FIG. 9. As door 42 traverses downwardly and outwardly, the flange 58 supporting drive pivot 158 is caused to rotate downwardly until the arc of travel thereof intersects a line between hinge 48 and airstair pivotal axis 66. In addition, during the initial outward movement of door 42, stop 45 is withdrawn from engagement with support pad 43 which in turn permits the airstair assembly 10 to rotate outwardly a limited distance about airstair pivotal axis 66 and cause flange 166 of yoke 72 to engage stop blocks 76 whereby the weight of the airstair assembly 10 is taken up by the operating rods 44. The above-noted operating sequence is best shown in FIGS. 11a and 11b and in part schematically in FIGS. 5a and 5b.

Further outward rotation of door 42 causes downward translation of operating rods 44, thus forcing rotation of yoke 72 in a counterclockwise direction as shown in FIGS. 11b and 11c. Concurrently, the airstair operating assembly including the pantograph links described at length above are caused to rotate in a counterclockwise direction about airstair pivotal axis 66. When door 42 reaches the point in its outward and upward travel as best shown schematically in FIG. 5b and in FIG. 11c, the downward travel of operating rod 44 ceases. Further, outwardly rotation of door 42 permits operating rods 44 to translate upwardly, thus causing airstair assembly 10 to rotate downwardly and outwardly in a clockwise rotation about airstair pivotal axis 66. As best seen in FIG. 9, the outward and upward rotation of door 42 permits sufficient clearance for airstair assembly 10 to pass outwardly toward its intended extended position. Continued upwardly rotation of door 42 to the position shown in FIGS. 1, 2 and 11e causes the airstair to fully extend and the wheels 38 of the airstair to engage the ground surface. Variations in the ground level are accommodated by the yoke 64 in that if the wheels 38 engage the ground surface prior to completion of opening of door 42, then stop blocks 76 are disengaged from stop flange 166 permitting the airstair assembly to support itself between airstair pivot axis 66 and the ground without torque upon the airstair operating assembly 46.

During the extension of the airstair assembly 10, the handrail can be seen in the various views as being erected into the position shown in FIG. 2 wherein rails extending along the length of the airstair are provided. The erection of the airstair handrail is accomplished by the unique linkage between inboard fixed handrail stanchion 88 and the fixed handrail stanchion 150 attached to the upper airstair segment. The remainder of the elements of the handrail are pivotally interengaged in a manner in which the handrail assumes a position nestled about the airstair segments when stowed, but is extended into a secure handrail for usage by persons mounting the stairs as shown in FIGS. 1 and 2.

The airstair handrail shown generally at 34 is made up of inboard fixed stanchion 88, inboard straight handrail segment 136, curved handrail segment 144, upper pivotally mounted stanchion 146, which is carried by stanchion stub 148, upper straight handrail segment 138, fixed stanchion 150, lower straight handrail segment 140, terminal handrail segment 142, lower pivotal stanchion 152, and terminal pivotal stanchion 154. The handrail is shown nestled in its stowed position in FIGS. 6 and 7, in a partially extended position in FIG. 9 and a fully extended position in FIG. 2. Referring specifically to the FIGS. 6 and 7 there is seen the fixed stanchion 88 attached to the air stair operating mechanism 46 and having the inboard straight handrail segment 136 extending substantially vertically upwardly therefrom. The curved handrail segment 144 extends downwardly from its intersection with the inboard straight handrail segment 136 to its engagement with stanchion 146. The other handrail elements similarly are situated as shown about the folded airstair segments 18 and 20. Referring to FIG. 9, rotation of the airstair elements outwardly causes the downward rotation of inboard straight handrail segment 136 due to an increase in distance between the upper end of inboard fixed stanchion 88 and the upper end of fixed stanchion 150. Completion of the outward and downward rotation of the airstair results in the handrail assuming the position shown in FIGS. 1 and 2.

To retract the stair and associated handrail in conjunction with closing of the door 42, the steps outlined above are reversed and the airstair is folded and stowed with the door abutting against the lower stair portion as is shown in FIGS. 6 and 7.

While the inventors have shown their preferred embodiment in discussing their invention in detail above, it is to be understood that various alterations and modifications of the preferred embodiment are possible and within the capabilities of those skilled in the art. These and other aspects of the invention including equivalents thereof will be apparent from an understanding of the subject matter as disclosed above and as set forth in the claims which follow.

What is claimed is:

1. An airborne stair and door structure for installation in an aircraft fuselage comprising:
    a door opening in said fuselage defined by a top, a sill and sides;
    a door having a hinge means at its upper edge engaging said aircraft fuselage, said door adapted to close said door opening;
    stair means carried by a support means mounted for rotation about a pivot on a frame means attached to said fuselage at said sill said stair means adapted to rotate outwardly through said door opening to provide access to and from said aircraft;
    at least one operating rod engaging said door at a pivot point spaced inwardly of said fuselage from said hinge means and mounted for reciprocation induced by rotation of said door about said hinge means, first downwardly upon initial movement of said door from a closed position, then past an over-center point and then upwardly upon continued rotation of said door toward an open position;
    stair actuator means operated by said operating rod causing rotation of said stair means inwardly of said fuselage upon downward movement of said operating rod and outward rotation of said stair means upon upward movement of said operating rod; and
    yoke means engaging said support means and said operational rod adapted to convert reciprocative motion of said rod to rotative motion of said support means, said yoke means permitting continued upward reciprocation of said rod without continued rotation of said support means upon engagement of said stair means with the ground or other support surface;
    whereby initial outward rotation of said door from a closed position to an intermediate position whereat said stair can rotate outwardly without engaging said door is accomplished without substantial outward rotation of said stair means and continued outward rotation of said door toward an open position rotates said stair means outwardly and then downwardly of said fuselage toward a ground engaging position; the stair means and the door being mechanically interconnected to counterbalance each other whereby power necessary to operate the door and stair means is minimized.

2. The apparatus of claim 1 wherein said stair means comprises upper and lower pivotally engaged stair segments, extendable to form a rigid stair means and including linkage means operative to fold said lower segment against said upper segment when said stair means is stowed within said fuselage.

3. The apparatus of claim 2 further including ground engaging wheel means carried by said lower stair segment.

4. The apparatus of claim 2 further including a pantograph type linkage for extending and retracting said lower stair segment during deployment and stowage of said stair means.

5. The apparatus of claim 4 wherein said lower stair segment carries a pivotally mounted ground engaging wheel means at the lower end thereof, said wheel means pivotally retractable with respect to said lower stair segment to minimize space required for stowage of said stair means within said aircraft.

6. The apparatus of claim 1 and a handrail means attached thereto, said handrail means being segmented and pivotally interconnected to said fuselage and said stair means whereby extension of said stair means erects said handrail into operative position and retraction of said stair means toward a stowed position within said fuselage collapses said handrail thereby decreasing space required for stowage.

7. The apparatus of claim 5 wherein said wheel means is pivoted from a first stowed position to a record ground engaging position during deployment of said stair means by a drive linkage interconnected to said pantograph linkage.

* * * * *